United States Patent [19]

Mörbe et al.

[11] Patent Number: 5,384,539
[45] Date of Patent: Jan. 24, 1995

[54] PROCESS FOR MONITORING INDUCTIVE LOADS FOR FAULTS ON THE CONTROL LINE USING SAMPLING TECHNIQUES

[75] Inventors: Matthias Mörbe, Ilsfeld-Helfenberg; Robert Kornhaas, Schwieberdingen, both of Germany

[73] Assignee: Robert Bosch GmbH, Stuttgart, Germany

[21] Appl. No.: 183,264

[22] Filed: Jan. 19, 1994

Related U.S. Application Data

[63] Continuation of Ser. No. 923,923, filed as PCT/EP91/00223, Feb. 6, 1991, published as WO91/15777, Oct. 17, 1991, abandoned.

[30] Foreign Application Priority Data

Mar. 30, 1990 [DE] Germany .......................... 4010198

[51] Int. Cl.6 ............................................. G01R 31/08
[52] U.S. Cl. .................................... 324/527; 324/546
[58] Field of Search ............... 324/527, 532, 535, 546, 324/654, 656; 123/479, 490; 361/154

[56] References Cited

U.S. PATENT DOCUMENTS

| | | | |
|---|---|---|---|
| 4,571,514 | 2/1986 | Nelson et al. | 307/234 |
| 4,736,267 | 4/1988 | Karlmann et al. | 361/101 |
| 4,746,869 | 5/1988 | Schrag et al. | 324/546 |
| 4,814,937 | 3/1989 | Uota | 361/154 |
| 4,932,246 | 6/1990 | Deutsch et al. | 73/119 A |
| 5,111,149 | 5/1992 | Lebesch | 324/546 |
| 5,173,832 | 12/1992 | Giorgetta et al. | 361/88 |
| 5,222,011 | 6/1993 | Braun | 361/154 |

FOREIGN PATENT DOCUMENTS 0249448  12/1987  European Pat. Off. .
3007464  9/1981  Germany .

OTHER PUBLICATIONS

N.T.I.S. Tech Notes, Nov. 1987, Springfield, Va., US NASA Tech Brief: "Pulse Test of Coil Insulation", p. 1068.

*Primary Examiner*—Kenneth A. Wieder
*Assistant Examiner*—Christopher M. Tobin
*Attorney, Agent, or Firm*—Spencer, Frank & Schneider

[57] ABSTRACT

A method for monitoring the operating condition of an inductive load including applying a control pulse to a control line coupled to the inductive load, generating a verification pulse indicating the operating condition of the inductive load, applying the verification pulse to the control line and sampling the verification pulse to determine the operating condition of the inductive load.

19 Claims, 3 Drawing Sheets

PROCESS FOR MONITORING INDUCTIVE LOADS FOR FAULTS ON THE CONTROL LINE USING SAMPLING TECHNIQUES

No. 07/923,923, filed as PCT/EP 91/00223, Feb. 6, 1991, published as WO91/15777, Oct. 17, 1991, now abandoned.

BACKGROUND OF THE INVENTION

1. Field of the Invention

The present invention relates to monitoring valve control lines for detecting faults and, more particularly, a process for monitoring a valve and its associated control line for detecting faults in either the valve or the control line.

2. Description of the Related Art

Processes for monitoring inductive loads, such as valves, for faults are known from DE-A1 0 249 448 and the DE-A1 30 07 464. In the latter specification, control and checking are carried out by the same control unit, but there are two separate lines provided for the two functions.

In control systems such as anti-locking systems, automatic slip control etc., the solenoid valves are arranged at a distance from the controller, and are connected with it in each case via a control line.

SUMMARY OF THE INVENTION

The present invention provides a process with which valves and their associated control lines can be monitored without an additional checking line for checking that both are free of faults. This monitoring is carried out via the control line and the control circuit. In order to reduce the number of lines, triggering and error message transmission are transmitted on one line. Fault diagnosis is possible via a defined impulse sequence.

BRIEF DESCRIPTION OF THE DRAWINGS

The invention is explained in greater detail on the basis of the design examples and diagrams represented in the following figures.

The figures show.

DESCRIPTION OF THE PREFERRED EMBODIMENT

Figure 1:
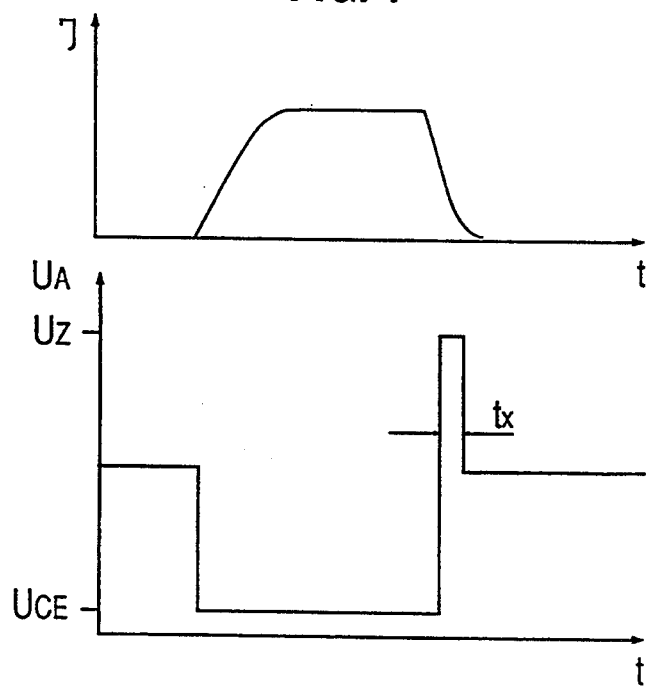
FIG. 1 shows representative waveforms of signals associated with controlling a solenoid valve.

For the invention, the cut-off peak, or inductive kickback, occurring when inductive loads are switched is a measure for the correct state of the high-level stage. If, for example, the inductance becomes smaller due to short-circuiting in the load or a short circuit in the coil, the time tx of the cut-off peak occurring after switching off alters. FIG. 1 shows on the one hand a waveform of current J in a switching process, e.g. of a valve, and secondly the corresponding voltage curve $U_A$ with reference to point A in FIG. 2.

Figure 2:
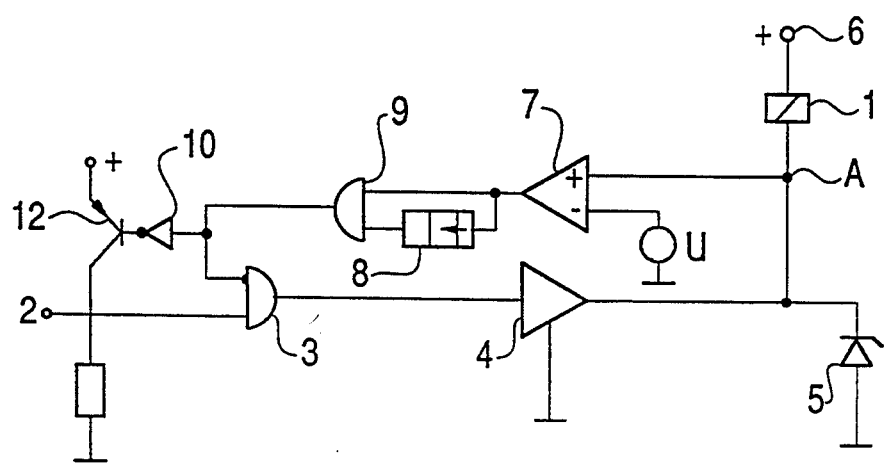
FIG. 2 shows a schematic block diagram of a first embodiment of the present invention.

In FIG. 2, the solenoid valve 1 is triggered via an input terminal 2, an AND-gate 3, a high-level stage 4 including a Zener diode 5 and a battery 6. A computer triggers the valve at appropriate times for control purposes, and on the other hand also monitors the valve for faults via the same control line to be connected at 2.

Figure 3:
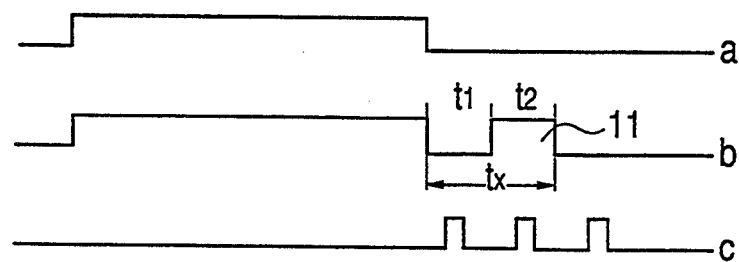
FIG. 3 shows representative waveforms of signals associated with controlling an inductive solenoid and checking for faults according to the present invention.

In the case of a fault-free valve, at the end of the drive signal, in accordance with FIG. 1, the cut-off peak, or inductive kickback, represented there occurs with the height $U_Z$ and width tx shown in the drawing. In FIG. 3a, the drive signal output from the computer is shown; FIG. 3b shows the signal appearing at terminal 2; FIG. 3c shows interrogation, or samples of the signal at terminal 2, impulses of the computer. In FIG. 3b, the duration tx of the cut-off peak is shown. With the occurrence of the cut-off peak, a comparator 7 with a predetermined reference voltage operates. With the aid of a time function element 8, with the time constant t (see FIG. 3b) and an AND-gate 9, the output signal of AND-gate 9 causes a signal to be input to an inverter 10 which corresponds to the impulse 11 shown in FIG. 3b. By way of the inverter 10 and a transistor 12, the impulse 11 is created at the terminal 2, the length of $t_2$ being conditioned by the cut-off peak or its decay below the reference voltage. In the case of a good valve, it is always the same impulse 11 which occurs, and which is thus a sign of a good valve.

During time $t_1$, the computer scans, through the first of the impulses of FIG. 3c, the low-potential on the control line, and then, through the second impulse, the high-potential occurring through a cut-off peak of the correct width. The low-potential is scanned once again in order to obtain additional information in the case of possibly too wide cut-off peaks due to inductances switched in series, or due to other faults. It is important that the sequence is controlled by the triggering itself, and that no additional interrupt loading occurs, and that only one line is required for triggering and acknowledgement.

Figure 4:
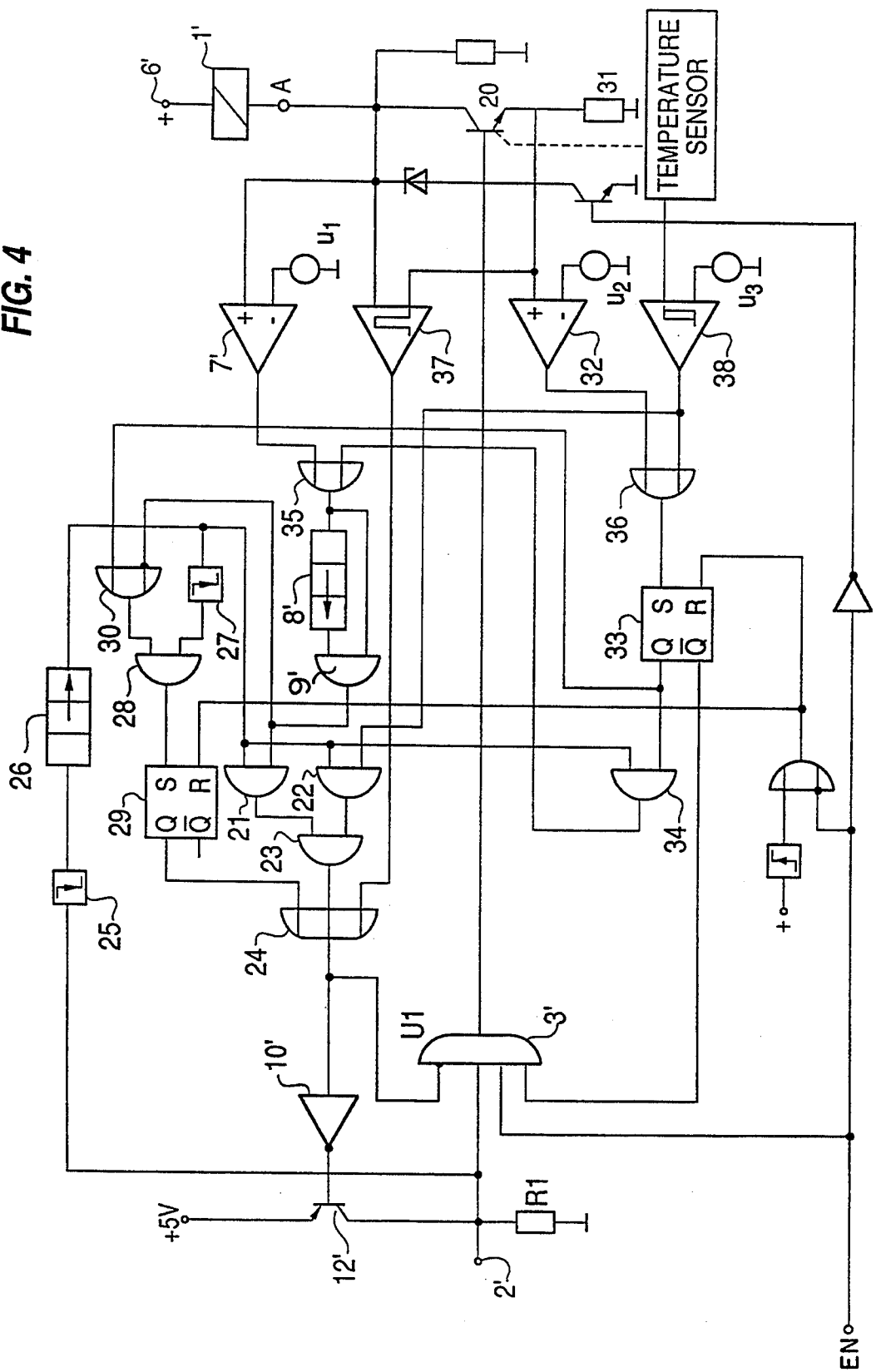
FIG. 4 shows a schematic block diagram of a second embodiment of the present invention.

In FIG. 4, a complete embodiment example is shown, the embodiment example of FIG. 2 being fully integrated.

Here the valve 1' is triggered from terminal 2' via an AND-gate 3' and a switching transistor 20. The comparator 7' corresponds to the comparator 7, the elements 9' and 8' correspond to the AND-gate 9 and the time element 8, respectively, and the elements 10' and 12' correspond to the inverter 10 and the transistor 12, respectively.

After switching off the drive signal in the case of a good valve a signal corresponding to the impulse 11 of FIG. 3b develops at terminal 2, produced by the output signal of the AND-gate 9' arriving after time $t_1$ at the inverter 10' and transistor 12' via gates 21, 23 and 34. The AND-gate 21 is conducting, because the element 25 reacting to the falling edge of the drive signal, triggers a time element 26 with the time constant $t_3$ which is longer than tx. Where valve 1' is good, the verification impulse 11' shown in FIG. 5a occurs at the terminal.

Figure 5:
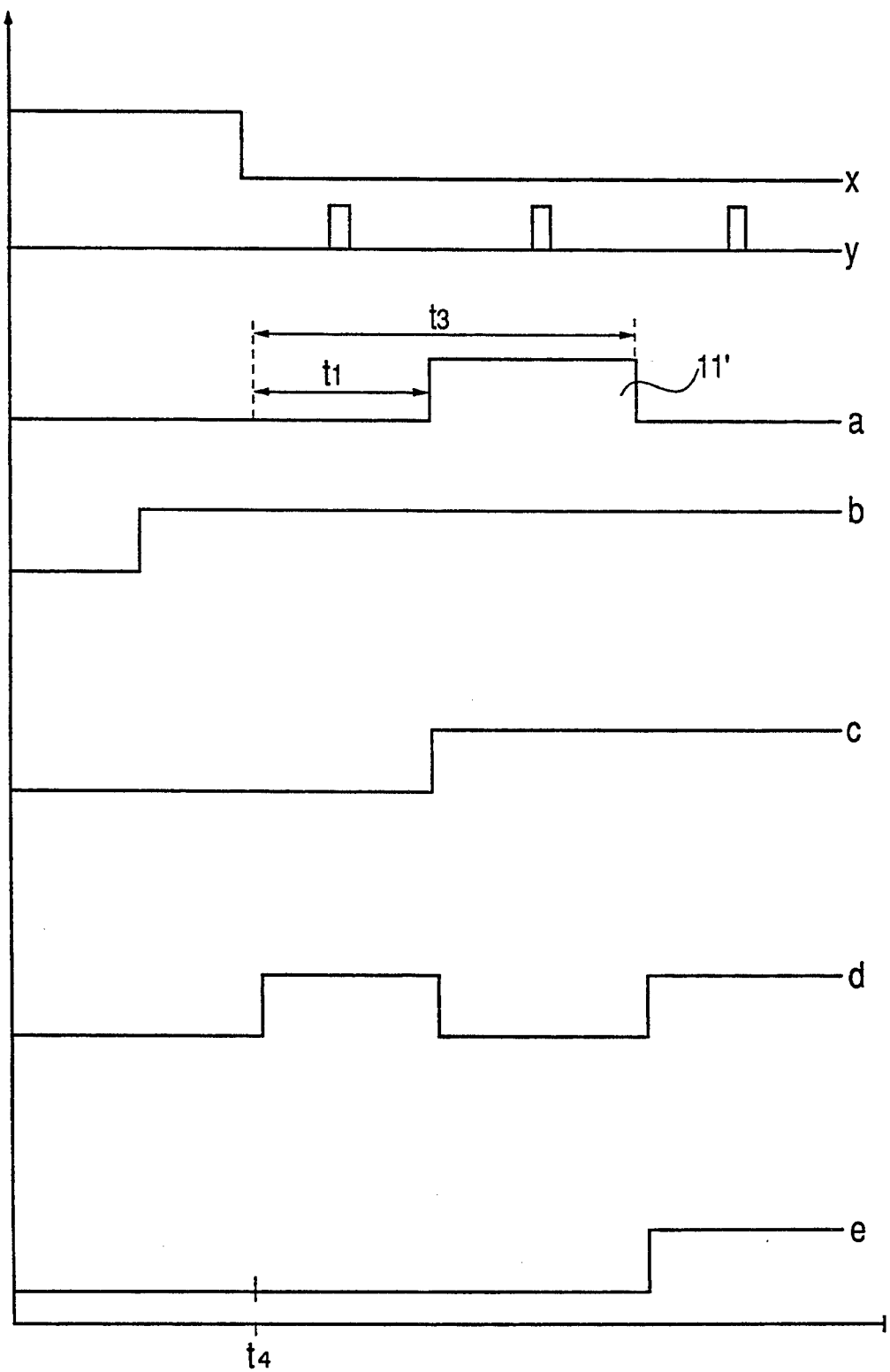
FIG. 5 shows representative waveforms of signals associated with controlling an inductive solenoid and checking for faults, and fault signals returned from the solenoid.

FIG. 5 shows in FIG. 5x a drive impulse ending at $t_4$, in FIG. 5y the sampling pulses, and in FIG. 5a–5e various acknowledgement signals (recognition signals), or waveforms generated in cases of different valve faults.

If a short circuit in coil occurs in valve 1', then the inductance is reduced and thus also the level of the induced voltage after transistor 20 turns off; thus the time is reduced in which the induced and limited voltage, i.e., the inductive kickback, is greater than the reference voltage of the comparator 7'. If this time is smaller than the time of the time element 8', then the output of gate 9' remains low.

After the end of the time of the time constant element 26, an element 27 sends a pulse to the input of the AND-gate 28. Due to the inverted input of an OR-gate 30, its output is a 1. Thus, the bistable element 29 is set, the 'Q' output of which then brings the terminal 2' to a high signal via the OR gate 24, inverter 10' and transistor 12'. The distinctive curve shown in FIG. 5e then results.

If a short-circuit occurs in valve 1' during triggering, then the voltage across resistor 31 is greater than the voltage level of a reference voltage of the comparator 32. Thus, a bistable element 33 is tripped, the Q-output of which then blocks the AND-gate 3' and also transistor 20.

At the end of triggering, the time element 26 is again triggered which causes the AND-gate 21 to conduct. Via an OR-gate 35 and the elements 8' and 9', after the end of $t_1$, a high signal is created which also brings about a high-signal at terminal 2' via the elements 21, 23, 10' and 12'. The AND-gate 28 is enabled by the tripped bistable element 33, so that with the end of the time constant of the time element 26, it switches and sets the bistable element 29. This means that the terminal remains on a high signal, and the curve of FIG. 5c is thus produced.

If a line break, or open, occurs at valve 1', then the voltage change caused by it is detected by a comparator 37. This immediately brings about a high signal at the terminal 2' via the elements 24, 10' and 12'. This also happens if the line break occurs during triggering (see FIG. 5b).

By using of a comparator 38, a temperature rise at transistor 20 can also be detected by using a well-known temperature detection device 39 coupled to comparator 38. The bistable element 33 is set and the triggering prevented by way of the AND-gate 3'.

Due to the output signal of the comparator 38 and the output signal existing after the end of triggering, the AND-gate 22 is conducting. Its output signal brings about a high signal at the terminal 2' via the elements 23, 24, 10' and 12'. With its output signal, the AND-gate 34 triggers the time element 8'; after the end of the time constant of the time element 8', the AND-gate 9' sends a signal to the AND-gate 21, which thus becomes conducting. The exclusive OR-gate 24 is thus blocked and thus a low signal is brought about at the terminal 2'. This lasts until at the end of $t_3$ of time element 26, the AND-gate 21 is again blocked. Simultaneously, a high signal is again brought about at the terminal 2' via the elements 27-29, 24, 10' and 12'. The curve shown in FIG. 5d results.

It can be seen from FIG. 5 that in cases of possible faults at the valve, recognition signals which deviate from the verification signal of FIG. 5a, and which identify the fault which has occurred, are created on the control line which can be sampled and recognised by the pulses of FIG. 3c.

The reset switching and the supply have not been described in further detail.

We claim:

1. A process for monitoring an inductive load for faults, wherein after the end of a drive signal transmitted to the inductive load via a control line, a check is made to determine whether the cut-off peak signal typically associated with a fault-free inductive load occurs, the method comprising the steps of:
    applying the drive signal to the control line for driving the inductive load,
    generating a verification signal on the control line which depends on the inductive load and the presence of a cut-off peak signal;
    sampling the verification signal on the control line at a first predetermined point in time after the end of the drive signal to determine whether the verification signal is present; and
    sampling the verification signal on the control line at a second predetermined period of time after the end of the drive signal to determine whether the verification signal is not present.

2. The process according to claim 1, wherein a duration of the verification signal depends on when the amplitude of the cut-off peak signal falls below a predetermined amplitude value.

3. The process according to claim 2, wherein a duration of a verification signal indicating a normal operating condition ends after a third predetermined period of time after the end of the drive pulse.

4. The process according to claim 2, wherein when a short-circuit condition of the inductive load exists, the verification signal generated has a first detection signal waveform indicating a short-circuit condition.

5. The process according to claim 2, wherein when an open-circuit condition of the inductive load exists, the verification signal generated has a second detection signal waveform indicating an open-circuit condition.

6. The process according to claim 2, wherein when an excess temperature condition is detected at a high level stage transistor, the verification signal generated has a third detection signal waveform indicating an excess temperature condition.

7. The process according to claim 2, wherein the inductive load is a solenoid valve, and the control line couples a controller of a control system to the solenoid valve, the process further comprising the step of periodically monitoring the verification signal of the solenoid valve.

8. A method for monitoring an operating condition of an inductive load comprising the steps of:
    applying a control pulse having a first predetermined duration to a control line coupled to the inductive load;
    comparing an amplitude of an inductive cut-off signal produced by the inductive load to a first predetermined amplitude at the end of the first predetermined duration of the control pulse;
    generating a first predetermined time delay when the amplitude of the inductive cut-off is greater than the first predetermined amplitude;
    generating a first predetermined waveform if the amplitude of the inductive cut-off signal is greater than the first predetermined amplitude at the end of the first predetermined time delay, the first predetermined waveform having a first arrangement of high and low potential levels indicative of an operating condition of the inductive load;
    coupling the first predetermined waveform to the control line;
    sampling the control line after a second predetermined period of time after the end of the control pulse to obtain a first sample;
    determining whether a high or a low potential level is present on the control line based on the first sample;

sampling the control line after a third predetermined period of time after the end of the control pulse to obtain a second sample, the third predetermined period of time being longer than the second predetermined period of time;

determining whether a high or a low potential level is present on the control line based on the second sample; and determining the operating condition of the inductive load based on the arrangement of high and low potentials levels determined to be present on the control line for the first and second samples.

9. The method according to claim 8, further comprising the steps of:

sampling the control line after a fourth predetermined period of time after the end of the control pulse to obtain a third sample, the fourth predetermined period of time being shorter than the second predetermined period of time;

determining whether a high or a low potential level is present on the control line based on the third sample; and determining the operating condition of the inductive load based on the arrangement of high and low potential levels determined to be present on the control line with the first, second and third samples.

10. The method according to claim 8, wherein the step of generating a first predetermined time delay includes the steps of:

generating a second signal when the amplitude of the inductive cut-off is greater than the first predetermined amplitude;

delaying the second signal to produce a third delayed signal; and generating the first predetermined time delay if the second signal and the third delayed signal coincide.

11. The method according to claim 8, wherein the step of determining whether a high or a low potential level is present on the control line based on the first sample determines that a high potential level is present, and the step of determining whether a high or a low potential level is present on the control line based on the second sample determines that a low potential level is present when the operating condition of the inductive load is a normal operating condition.

12. The method according to claim 8, further comprising the steps of:

generating a second predetermined waveform if the amplitude of the inductive cut-off signal is not greater than the first predetermined amplitude at the end of the first predetermined time delay, the second predetermined waveform having a second arrangement of high and low potential levels indicative of a short-circuit of a coil operating condition of the inductive load;

coupling the second predetermined waveform to the control line;

sampling the control line after the second predetermined period of time after the end of the control pulse to obtain the first sample;

determining whether a high or a low potential level is present on the control line based on the first sample; and sampling the control line after the third predetermined period of time after the end of the control pulse to obtain the second sample;

determining whether a high or a low potential level is present on the control line based on the second sample; and determining that a short-circuit of a coil operating condition of the inductive load exists based on the arrangement of high and low potential levels determined to be present on the control line for the first and second samples.

13. The method according to claim 12 wherein the step of determining whether a high or a low potential level is present on the control line based on the first sample determines that a low potential level is present, and the step of determining whether a high or a low potential level is present on the control line based on the second sample determines that a high potential level is present.

14. The method according to claim 9, further comprising the steps of:

generating a third predetermined waveform if an open circuit operating condition of the inductive load exists before the end of the first predetermined time delay, the third predetermined waveform having a third arrangement of high and low potential levels;

coupling the third predetermined waveform to the control line;

sampling the control line after the fourth predetermined period of time after the end of the control pulse to obtain the third sample;

determining whether a high or a low potential level is present on the control line based on the third sample;

sampling the control line after the second predetermined period of time after the end of the control pulse to obtain the first sample;

determining whether a high or a low potential level is present on the control line based on the first sample;

sampling the control line after the third predetermined period of time after the end of the control pulse to obtain the second sample;

determining whether a high or a low potential level is present on the control line based on the second sample; and determining that an open circuit operating condition of the inductive load exists based on the arrangement of high and low potential levels determined to be present on the control line for the first, second and third samples.

15. The method according to claim 14, wherein the step of determining whether a high or a low potential level is present on the control line based on the third sample determines that a high potential level is present, the step of determining whether a high or a low potential level is present on the control line based on the first sample determines that a high potential signal is present, and the step of determining whether a high or a low potential level is present on the control line based on the second sample determines that a high potential level is present.

16. The method according to claim 9, further comprising the steps of:

generating a fourth predetermined waveform if a temperature rise operating condition of a transistor driving the inductive load exists, the fourth predetermined waveform having a fourth arrangement of high and low potential levels;

coupling the fourth predetermined waveform to the control line;

sampling the control line after the fourth predetermined period of time after the end of the control pulse to obtain the third sample;

determining whether a high or a low potential level is present on the control line based on the third signal;

sampling the control line after the second predetermined period of time after the end of the control pulse to obtain the first sample;

determining whether a high or a low potential level is present on the control line;

sampling the control line after the third predetermined period of time after the end of the control pulse to obtain the second sample;

determining whether a high or a low potential level is present on the control line based on the second sample; and determining that a temperature rise operating condition of the inductive load exists based on the arrangement of high and low potential levels determined to be present on the control line for the first, second and third samples.

17. The method according to claim 16, wherein the step of determining whether a high or a low potential level is present on the control line based on the third sample determines that high potential level is present, the step of determining whether a high or a low potential level is present on the control line based on the first sample determines that a low potential level is present, and the step of determining whether a high or a low potential level is present on the control line based on the second sample determines that a high potential level is present.

18. The method according to claim 9, further comprising the steps of:

generating a fifth predetermined waveform if a short-circuit operating condition of the inductive load which occurs during application of the control pulse exists, the fifth predetermined waveform having a fifth arrangement of high and low potential levels;

coupling the fifth predetermined waveform to the control line;

sampling the control line after the fourth predetermined period of time after the end of the control pulse to obtain the third sample;

determining whether a high or a low potential level is present on the control line based on the third sample;

sampling the control line after the second predetermined period of time after the end of the control pulse to obtain the first sample;

determining whether a high or a low potential level is present on the control line based on the first sample;

sampling the control line after the third predetermined period of time after the end of the control pulse to obtain the second sample;

determining whether a high or a low potential level is present on the control line based on the second sample; and determining that a short circuit operating condition of the inductive load occurred during application of the control pulse exists based on the arrangement of high and low potential levels determined to be present on the control line for the first, second and third samples.

19. The method according to claim 18, wherein the step of determining whether a high or a low potential level is present on the control line based on the third sample determines that a low potential level is present, the step of determining whether a high or a low potential level is present on the control line after based on the first sample determines that a high potential level is present, and the step of determining whether a high or a low potential level is present on the control line determines that a high potential level is present.

* * * * *